(12) United States Patent
Hilgers

(10) Patent No.: US 8,395,487 B2
(45) Date of Patent: *Mar. 12, 2013

(54) DATA CARRIER WITH SENSOR

(75) Inventor: Achim Hilgers, Alsdorf (DE)

(73) Assignee: NXP B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/422,511

(22) Filed: Mar. 16, 2012

(65) Prior Publication Data

US 2012/0176228 A1    Jul. 12, 2012

Related U.S. Application Data

(63) Continuation of application No. 12/094,308, filed as application No. PCT/IB2006/054404 on Nov. 23, 2006, now Pat. No. 8,143,999.

(30) Foreign Application Priority Data

Nov. 24, 2005   (EP) ..................... 05111251

(51) Int. Cl.
*H04Q 5/22*    (2006.01)

(52) U.S. Cl. ............. 340/10.5; 340/10.1; 340/10.2; 340/10.3; 340/10.31; 340/10.32; 340/10.33; 340/10.34; 340/10.4; 340/10.41; 340/10.42; 340/10.51; 340/10.52

(58) Field of Classification Search ........ 340/10.1–10.6, 340/572.1–572.9
See application file for complete search history.

(56) References Cited

U.S. PATENT DOCUMENTS

| | | | | |
|---|---|---|---|---|
| 3,541,995 A | * | 11/1970 | Fathauer ............... | 119/51.02 |
| 5,461,385 A | * | 10/1995 | Armstrong ............. | 342/42 |
| 5,764,138 A | * | 6/1998 | Lowe ................... | 340/447 |
| 5,764,537 A | * | 6/1998 | Walter et al. .......... | 702/179 |
| 6,205,857 B1 | * | 3/2001 | Nakajima ............... | 73/504.16 |
| 6,448,767 B1 | * | 9/2002 | Ganther et al. ......... | 324/248 |
| 6,731,116 B2 | * | 5/2004 | Yamamoto et al. ....... | 324/522 |
| 6,806,808 B1 | * | 10/2004 | Watters et al. ......... | 340/10.41 |
| 6,814,295 B2 | | 11/2004 | Posch et al. | |
| 6,829,924 B2 | * | 12/2004 | Nantz et al. ........... | 73/146 |
| 6,995,672 B1 | * | 2/2006 | Yones .................. | 340/572.1 |
| 7,005,987 B2 | | 2/2006 | Sinnett | |
| 7,032,822 B2 | * | 4/2006 | Waters ................. | 235/454 |
| 7,113,678 B1 | * | 9/2006 | Onishi ................. | 385/101 |
| 7,193,522 B2 | * | 3/2007 | Michael et al. ......... | 340/686.1 |
| 7,288,852 B2 | | 10/2007 | Hattori | |
| 7,374,097 B2 | * | 5/2008 | Bergler ................ | 235/492 |
| 7,495,558 B2 | | 2/2009 | Pope | |
| 7,584,061 B2 | * | 9/2009 | Wilf et al. ............ | 702/35 |
| 7,586,397 B2 | * | 9/2009 | Bayley et al. .......... | 340/10.4 |
| 7,604,170 B2 | | 10/2009 | Amtmann et al. | |
| 7,652,575 B2 | * | 1/2010 | Lyons et al. ........... | 340/572.1 |
| 7,800,200 B2 | * | 9/2010 | Usami .................. | 257/536 |

(Continued)

FOREIGN PATENT DOCUMENTS

| | | |
|---|---|---|
| CN | 1383525 A | 12/2002 |
| CN | 1643541 A | 7/2005 |

(Continued)

*Primary Examiner* — George Bugg
*Assistant Examiner* — Paul Obiniyi

(57) ABSTRACT

In a circuit for a data carrier, which data carrier comprise a sensor that is designed for providing a sensor signal that represents an environment parameter and a communication element that is designed for the contact-less communication with an interrogator station, first connection elements for connecting the circuit to the communication element and second connection elements for establishing an electronic connection of the circuit to the sensor are provided, wherein the second connection elements are realized by the first connection elements and wherein the circuit comprises a sensor signal processing stage designed for receiving said sensor signal via the first connection element and for processing said received sensor signal.

12 Claims, 5 Drawing Sheets

U.S. PATENT DOCUMENTS

| | | | |
|---|---|---|---|
| 7,855,637 B2 * | 12/2010 | Forster | 340/539.1 |
| 2002/0010871 A1 * | 1/2002 | Thueringer et al. | 713/320 |
| 2003/0042909 A1 * | 3/2003 | Yamamoto et al. | 324/522 |
| 2004/0061610 A1 * | 4/2004 | Michael et al. | 340/562 |
| 2004/0100834 A1 * | 5/2004 | Waters | 365/200 |
| 2005/0174829 A1 * | 8/2005 | Bergler | 365/145 |
| 2005/0248455 A1 | 11/2005 | Pope et al. | |
| 2006/0215973 A1 * | 9/2006 | Onishi | 385/101 |
| 2007/0175268 A1 * | 8/2007 | Honda | 73/35.04 |
| 2008/0204240 A1 * | 8/2008 | Hilgers et al. | 340/572.1 |
| 2009/0149718 A1 * | 6/2009 | Kim et al. | 600/300 |
| 2011/0054813 A1 * | 3/2011 | Moreau et al. | 702/59 |

FOREIGN PATENT DOCUMENTS

| | | | |
|---|---|---|---|
| EP | 0563713 A2 | | 10/1993 |
| EP | 1884787 A1 | * | 2/2008 |
| GB | 2344232 A | * | 5/2000 |
| JP | 200007916 A | | 3/2000 |
| JP | 2003016565 A | | 1/2003 |
| JP | 2005032256 A | | 2/2005 |
| WO | 02073523 A1 | | 9/2002 |
| WO | 2005046108 A2 | | 5/2005 |

* cited by examiner

DATA CARRIER WITH SENSOR

RELATED PATENT DOCUMENTS

This patent document is a continuation under 35 U.S.C. §120 of U.S. patent application Ser. No. 12/094,308 filed on May 20, 2008 (U.S. Pat. No. 8,143,999), which is a 35 U.S.C. §371 national stage entry of International Application No. PCT/IB2006/054404 filed on Nov. 23, 2006, which claims priority benefit under 35 U.S.C. §119 of European Patent Application No. 05111251.4 filed on Nov. 24, 2005, to which priority is also claimed here.

FIELD OF THE INVENTION

The invention relates to a circuit for a data carrier, which circuit is designed for communicating with a read and/or write station.

The invention further relates to a data carrier comprising a circuit according to the preceding paragraph and sensor means.

The invention further relates to a system for communicating measurement data, which system comprises a data carrier according to the preceding paragraph and a read and/or write station.

The invention further relates to a method of interrogating a sensor signal from sensor means in a data carrier, which data carrier comprises a circuit according to the first paragraph and sensor means.

The invention further relates to a sensor for use in a data carrier according to the second paragraph.

BACKGROUND OF THE INVENTION

A system for communicating measurement data that performs a method of interrogating measurement signals from sensor means in a data carrier is known from the document EP0563713. The known system comprises a read/write station and at least one data carrier of the contactless type. The data carrier comprises an integrated circuit for logic operations and signal processing and a communication coil arrangement that is connected to the circuit. The communication coil arrangement is designed for the inductive coupling with a corresponding communication coil arrangement of the read/write station such that the circuit in the data carrier can be electrically powered and operated by means of a radio frequency signal that is generated and transmitted by the read/write station. The data carrier further comprises sensor means that are designed for sensing an environment parameter and for providing a sensor signal that represents the sensed environment parameter. In the prior art data carrier, the communication coil arrangement is connected to the circuit via antenna-connection pads. The sensor means are connected to the circuit via sensor-connection means that are different from the antenna-connection pads. The sensor means are powered via the circuit. In operation the known read/write station generates said radio frequency (RF) carrier signal that powers said data carrier and transmits a sensor data interrogation command to the data carrier. The circuit of the data carrier detects this command and interrogates said sensor signal from the sensor means and returns measurement data representing the sensor signal via the RF signal.

The known system suffers from the problem that sensor means must be either integrated with the circuit in order to utilize a semiconductor-based interface with the circuit, which integration is obviously relatively expensive and takes much semiconductor space, or the sensor means must be connected via additional connection pads to the circuit in the case of utilizing a conventional sensor located externally with regard to the circuit.

OBJECT AND SUMMARY OF THE INVENTION

It is an object of the invention to provide a circuit of the type mentioned in the first paragraph and a data carrier of the type mentioned in the second paragraph and a system of the type mentioned in the third paragraph and a method of the type mentioned in the fourth paragraph which obviate the drawbacks described above.

To achieve the object described above, characteristic features according to the invention are provided with a circuit according to the invention, so that a circuit according to the invention can be characterized as follows:

Circuit for a data carrier, which data carrier comprises sensor means that are designed for providing a sensor signal that represents an environment parameter and communication means that are designed for contactless communication with an interrogator station, said circuit comprising first connection means for connecting the circuit to the communication means and second connection means for establishing an electronic connection of the circuit with the sensor means, wherein the second connection means are realized by the first connection means, and wherein the circuit comprises sensor signal processing means designed for receiving said sensor signal via the first connection means and for processing said received sensor signal.

To achieve the object defined above, a data carrier according to the invention comprises a circuit according to the invention.

To achieve the object defined above, a system according to the invention comprises a read and/or write station and at least one data carrier according to the invention.

To achieve the object defined above, characteristic features according to the invention are provided with a method according to the invention, so that a method according to the invention can be characterized as follows:

Method of interrogating a sensor signal from sensor means in a data carrier, which data carrier is designed according the invention, which method comprises a step of receiving the sensor signal via first connection means of the circuit of the data carrier, which connection means are connected to communication means of the data carrier and establish an electronic connection between the circuit and the sensor.

To achieve the object described above, characteristic features according to the invention are provided with a sensor according to the invention, so that a sensor according to the invention can be characterized as follows:

In an example embodiment there is a circuit for a data carrier, which data carrier comprises sensor means for providing a sensor signal that represents an environment parameter and communication means for contactless communication with an interrogator station. The circuit comprises a first connection means for connecting the circuit to the communication means for communicating with the interrogator station, and for receiving radio frequency power from the interrogator station. There is a second connection means for establishing an electronic connection of the circuit to the sensor means, wherein the second connection means are realized by the first connection means and a sensor signal processing means for receiving said sensor signal via the first connection means, for processing said received sensor signal, and for providing an output based upon the received sensor signal, to the interrogator station via the first connection means. A first connection pad and a second connection pad constitute the first connection means, the respective pads coupling the circuit for simultaneously communicating with both the communication means and the sensor means. A circuit configured and arranged to short-circuit radio frequency signals is coupled to the connection pads from the communication means, during a sensing period in which the signal processing means is receiving a signal from the sensor means, via the respective pads.

The provision of the characteristic features according to the invention create the advantage that a sensor can be connected to the circuit of the data carrier in a relatively simple manner by using the first communication means of the circuit both for the purpose of exchanging data with the read/write station and for the purpose of interrogating the sensor signal from the sensor. This in addition provides the advantage that no semiconductor-based interface needs to be provided within the circuit and no dedicated additional connecting means are required in the circuit for facilitating a connection of the sensor to the circuit. In particular, existing and well proven standard sensors, which are relatively inexpensive and are either of the-self powered or non-self-powered type, can be incorporated and used within the data carrier in a reliable and efficient way, which will accelerate the commercial market penetration of sensor-equipped radio-frequency identification devices for e.g. logistics, safety applications, and/or goods-monitoring purposes. In a preferred embodiment of the invention, the sensor according to the invention will be used in a data carrier according to the invention, because it provides the advantage that the supporting power source of the sensor will only be utilized when an RF field is received via the communication means of the data carrier. This will significantly prolong the operational life of the supporting power supply of the sensor, because the supporting power supply will only be utilized if there is a certain probability that the sensor signal will be interrogated, which in fact will only take place upon receiving of the RF field which provides electrical power for the operation of the circuit of the data carrier.

Some solutions of the invention provide connectors for connecting the communication means of the data carrier to the circuit of the data carrier. In a preferred solution, however, the circuit comprises connection pads for allowing the communication means to be bonded or soldered to the circuit. This provides the advantage that the circuit can be easily connected to the communication means of the data carrier, while at the same time an electrical contact with the sensor can be established, by having the sensor connection pads or wires either directly connected to the connection pads of the circuit or directly connected to parts of the communication means, which in all cases provides an electrical connection between the sensor and the circuit via only the connection pads of the circuit to which the communication means are connected.

Other solutions according to the invention offer the advantage that the sensor signal received via the connection pads of the circuit can be picked up from the connection pads of the circuit in a well controlled and very efficient manner with or without being superimposed on the RF signal for further processing.

Still other solutions of the invention offer the advantage that the measurement time period for picking up or receiving the sensor signal can be precisely defined or timed in dependence on e.g. further processing procedures, and consequently the timing can take other operations or operational modes of the circuit not related to the processing of sensor signals into account, thus avoiding any disturbance of the other operations by the picking-up of the sensor signal.

Still other solutions of the invention offer the advantage that the measurement time period will take physical boundary conditions into account. These physical boundary conditions are either given by electrical characteristics of the circuit (e.g. charging time constant of a measurement capacitor, power consumption of the circuit and available buffered power, or the like) and the electrical characteristics of the sensor or by the way the sensor signal is processed within the circuit. This will increase the reliability of the entire system.

Still other solutions of the invention offer the advantage that the sensor signal processing means offer a dedicated conversion of the sensor signal into a representation of the sensor signal which fits the further processing requirements. The sensor signal processing means incorporating these dedicated sensor signal converting means render possible an independent operation (switch-on or -off) of the converting means, independent of general processing means of the circuit. This renders it possible to reduce the power consumption, because the converting means only need to be in operation during a relatively short time period, which may or may not be equal to the measurement time period.

Still other solutions of the invention offer the advantage that separate general processing means are provided which provide a dedicated utilization of the representation of the sensor signal.

These and other aspects of the invention are apparent from and will be elucidated with reference to the embodiments described hereinafter, but the invention is by no means limited to these embodiments.

BRIEF DESCRIPTION OF THE DRAWINGS

The invention will now be described in greater detail by way of non-limiting example with reference to the embodiments shown in the drawings.

DESCRIPTION OF EMBODIMENTS

Figure 1:
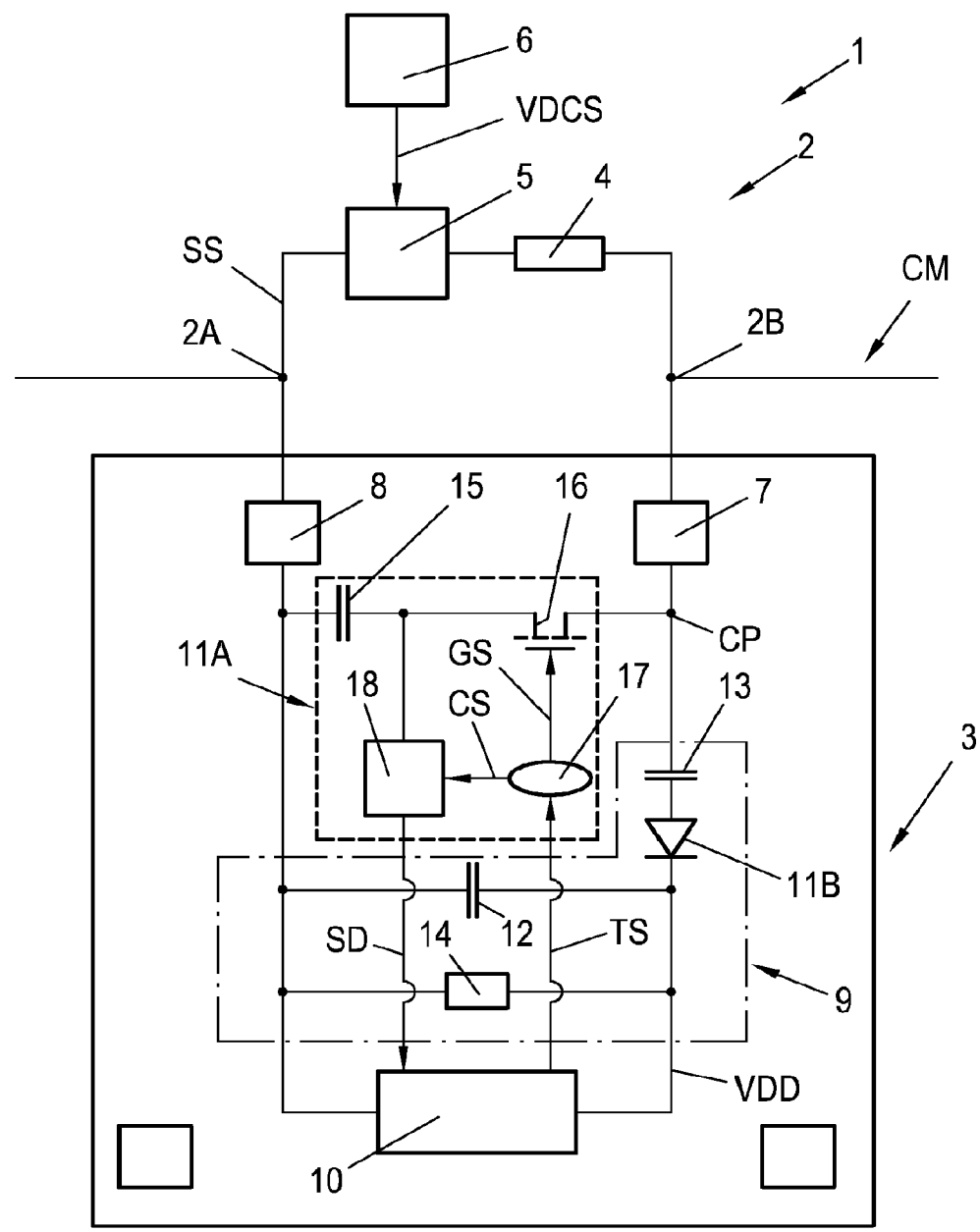
FIG. 1 shows a data carrier according to a first embodiment of the invention in the form of a block diagram.

FIG. 1 shows a data carrier 1 designed for contactless communication with a so-called read/write station (not shown in FIG. 1) according to the international standard ISO14443 Type A. It is noted that other standards, such as ISO 14443 Type B or other standards relating to so-called near-field communication (NFC) devices or to ultra high frequency applications, may alternatively be used. Generic communication protocols may also be considered. In general, the combination of at least one such a data carrier 1 and the read/write station realizes a system for communicating data, as will be explained in more detail below.

The data carrier 1 comprises sensor means, a circuit 3, and communication means.

The sensor means are designed for providing a sensor signal SS that represents an environment parameter. In the present case, the sensor means are realized by a temperature sensor (denoted sensor 2 below) and the sensor signal SS represents the ambient temperature adjacent the data carrier 1. The sensor 2 comprises sensor connection pads 2A and 2B designed to provide an electrical connection to the circuit 3. The sensor 2 further comprises a radio frequency (RF) blocking inductance 4, a sensitive device 5, and a supporting energy source 6. As shown in FIG. 1, the sensitive device 5 is connected in series with the RF blocking inductance 4, which ensures that an RF signal applied between the sensor connection pads 2A and 2B is blocked from passing the sensitive device 5. The sensitive device 5 is schematically connected to the supporting energy source 6, such that the supporting voltage VDCS can be provided to the sensitive device 5 without disturbing the RF performance of the data carrier 1. In the present case, the value of the sensor signal SS is a function of the ambient temperature. Obviously, however, other sensor types, e.g. gas identification sensors or air pressure sensors or radiation-sensitive sensors or the like, may also be used, and the sensor signal SS represents the respective environment parameter. It may be further noted that the sensor signal SS may also show a form or shape or a frequency or phase that is dependent on the environment parameter.

The communication means are realized as a dipole antenna CM. This dipole antenna CM is designed for receiving an RF signal from the read/write station and for providing said RF signal to the circuit 3 for the purpose of supplying energy to the circuit 3 and for exchanging data with the circuit 3. FIG. 1 shows only part of this dipole antenna CM.

The circuit 3 is realized as an integrated circuit. It is noted in this connection that a discrete realization is also possible. The circuit 3 comprises first connection means designed for connection to the communication means CM of the data carrier 1. In the present case the first connection means are formed by connection pads 7 and 8, which are provided and designed to allow the dipole antenna CM to be connected to the circuit 3 by means of soldering. It is noted that the connection means CM may be designed for establishing a bonding connection, i.e. designed as bonding pads, or alternatively designed as a plug-in connector, but other techniques providing the required electrical connection may also be considered.

The circuit 3 further comprises supply voltage generating means 9 and general processing means 10 and sensor signal processing means 11A.

The supply voltage generating means 9 are designed for generating a supply voltage VDD based on the received RF signal and required for powering the general processing unit 10 and at least parts of the sensor signal processing means 11A. The supply voltage generating means 9 comprise a Schottky diode 11B and a buffer capacitor 12 which are connected in series between the connection pads 7 and 8, as shown in FIG. 1. The supply voltage generating means 9 further comprise a blocking capacitor 13, which provides a blocking of the DC supply voltage VDD, established by means of the Schottky diode 11B and the buffer capacitor 12, from the dipole antenna CM in order to avoid any short-circuiting of the supply voltage VDD by the dipole antenna CM. The supply voltage generating means 9 further comprise a resistor 14 connected in parallel with the buffer capacitor 12 for guaranteeing a minimum forward current for the Schottky diode 11B. Although the resistor 14 is described as an individual circuit element, it can be mentioned that it basically reflects the load produced by the circuit 3 that causes at least a minimum current flow.

The general processing means 10 are designed for processing data that are transported by means of the RF signal from the read/write station to the data carrier 1 and for communicating data back to the read/write station by means of the RF signal. Several different designs for performing these functions are known to those skilled in the art and will therefore not be discussed in detail here. Focusing now on the invention, the general processing means 10 are designed for generating a timing signal TS and providing it to the sensor signal processing means 11A for allowing the sensor signal processing means 11A to process the sensor signal SS during a time period determined by the timing signal TS. The general processing means 10 are further designed to receive from the sensor signal processing mean 11A sensor data SD which represent the sensor signal SS, and to communicate these sensor data SD to the read/write station, e.g. upon receiving an inquiry command from the read/write station.

The sensor signal processing means 11A are designed for receiving said sensor signal SS via said connection pads 8 and 7 and are designed for processing said received sensor signal SS in order to produce the sensor data SD. The sensor signal processing means 11 comprises a measurement capacitor 15, a first switching transistor 16, a timing stage 17, and an analog/digital converter 18.

The measurement capacitor 15 is connected between the connection pads 7 and 8 in series with the first switching transistor 16, as shown in FIG. 1. The timing stage 17 comprises an input that is connected to the general processing means 10 for receiving said timing signal TS. The timing stage 17 further comprises a first output that is connected to the gate of the first switching transistor 16 for applying a conductivity control signal GS to the control electrode of the first switching transistor 16. In the present case, the first switching transistor 16 is a so-called enhancement mode Field Effect Transistor (FET) and therefore the control electrode is designated as "gate". In the case of a bipolar transistor of e.g. the commonly known NPN or PNP type, the control electrode is designated as "base". The timing stage 17 further comprises a second output that is connected to the analog/digital converter 18 for applying a converter control signal CS to the analog/digital converter 18. The analog/digital converter 18 is connected with its input between the measurement capacitor 15 and the first switching transistor 16 for sensing the analog value of the voltage that can be tapped from the measurement capacitor 15 at this circuit point. Those skilled in the art will immediately understand that the measurement or data acquisition is performed on the basis of a reference potential, which is not explicitly indicated in the Figures. It is further noted that a resistor, which would also enable a voltage drop to be tapped, may replace the measurement capacitor 15.

In the present case, the timing signal TS triggers the timing stage 17 to release the conductivity control signal GS for a certain measurement time period t, such that during the measurement time period t the first switching transistor 16 is in its conducting mode and after the measurement time period t the first switching transistor 16 is in its non-conducting mode. This causes the measurement capacitor 15 to be charged by the sensor signal SS during the measurement time period t. After the measurement time period t has elapsed, the timing stage 17 releases the converter control signal CS, which triggers the analog/digital converter 18 to convert the voltage picked up between the measurement capacitor 15 and the first switching transistor 16 into the sensor data SD. The analog/digital converter 18 thus constitute converter means designed for converting the sensor signal SS into a representation signal, i.e. representative of the sensor data SD.

Due to the fact that during the measurement time period t the measurement capacitor 15 short-circuits the RF signal received via the dipole antenna CM and consequently the circuit needs to be powered by the buffer capacitor 12, the measurement time period t is limited between a lower time period limit $t_1$ and an upper time period limit $t_0$ according to the following relation:

$$t_1 \leq t \leq t_0$$

The lower time period limit $t_1$ depends on the charging time constant for charging the measurement capacitor 15, which is determined by the capacitance value C1 of the measurement capacitor 15 and an ohmic component RL2 of the RF blocking impedance L2 and a conducting mode resistance RT1 of the first switching transistor 16, as represented by the following (first) equation:

$$t_1 \geq (RL2+RT1) \cdot C1$$

The upper time period limit $t_0$ is defined by the electrical characteristics of the circuit 3. Of relevance is the power consumption PCHIP at a minimum required supply voltage VDD value UCHIP and a capacitance value $C_0$ of the buffer capacitor 12. The following (second) equation shows the dependence of the upper time period limit $t_0$ on these parameters:

$$t_0 \leq \frac{C_0 \cdot UCHIP^2}{2 \cdot PCHIP}$$

In order to guarantee a proper functioning of the data carrier 1, the parameters used in the two equations above, defining the two time period limits $t_1$ and $t_0$, need to be carefully weighed against each other.

In a further embodiment, a further RF blocking inductance can be connected in series with the drain of the first switching transistor 16 and a connection point CP to which the connection pad 7 and the blocking capacitor 13 are connected. This further RF blocking inductance can improve the operation of the circuit 3 because the RF signal is practically blocked from being short-circuited by the measurement capacitor 15 during the measurement time period t, and consequently the RF signal can still be used for generating the supply voltage VDD during the measurement time period t.

It is to be noted that the two signals CS and GS produced by the timing stage 17 may alternatively be produced by the general processing means 10, in which case the timing stage 17 can be omitted. It may further be noted that the signal CS can be used to trigger the analog/digital converter 18 at the same moment at which the first switching transistor 16 is switched to its conducting mode, which means that only one signal would be required.

Figure 2:
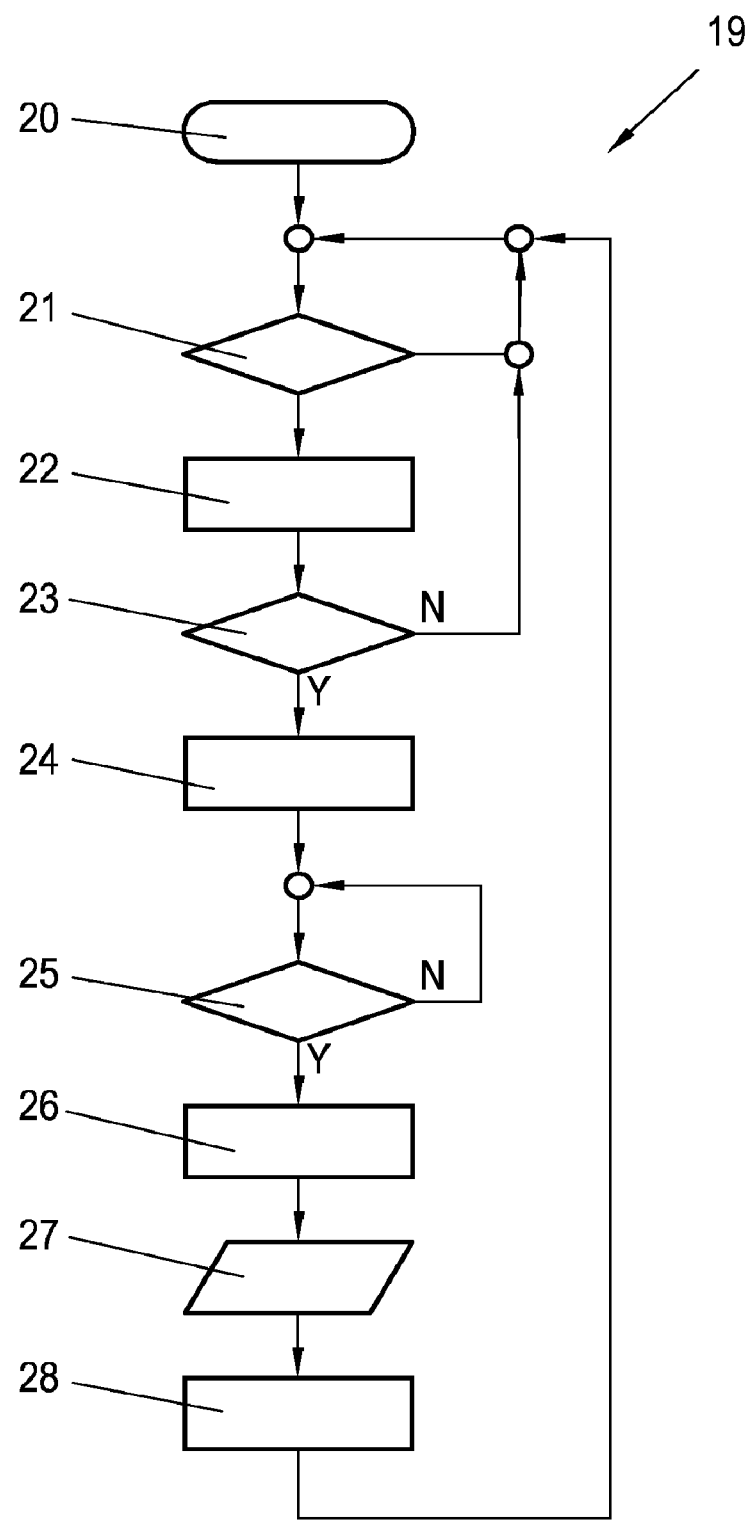
FIG. 2 is a flow chart of a method according to the invention performed by the data carrier according to the first embodiment of the invention.

The operation of the data carrier 1 will be described below with reference to a flowchart shown in FIG. 2, which discloses a method of interrogating the sensor signal SS from the sensor 2 in the data carrier 1, which is denoted method 19 in the following.

The method 19 starts in a block 20, where it is assumed that an RF field produced by the read/write station is available at the location of the data carrier 1.

The method 19 continues in a block 21, in which it is tested whether the received RF field produced by the read/write station is available at the location of the data carrier 1 with a sufficient strength in order to start the operation of the data carrier 1, which is a basic requirement. If this basic requirement is not fulfilled, the method 19 branches back along the N branch into a waiting loop until the basic requirement is fulfilled. If the basic requirement is fulfilled, the method 19 follows the Y branch leading into a block 22.

In block 22, a standard operation of the data carrier is started, in which standard operation the data carrier will receive commands from the read/write station and communicate response messages back to the read/write station, the RF field being utilized for communication purposes and for powering the data carrier 1 in both cases.

According to the invention, it is also tested in a block 23 whether sensor data SD are desired. This desire may arise because of a command received from the read/write station or because of an internal timing or logic state or processing of software or firmware. If no sensor data SD are desired, the method 19 follows the N branch into the loop described in the preceding paragraph. If sensor data SD are desired, the method 19 follows the Y branch leading into a block 24.

In block 24, the first switching transistor 16 is switched into its conductive mode and the method continues with block 25.

In block 25 it is checked whether the measurement time period t has elapsed. If the measurement time period t has not yet elapsed, the method follows the N branch into a loop continuing testing whether the measurement time period t has elapsed or not. In the meantime the circuit 3 is powered by the buffer capacitor 12, and the sensor 2 charges the measurement capacitor 15. If the measurement time period t has elapsed, the method follows the Y branch leading into a block 26.

In block 26, the first switching transistor 16 is switched into its non-conductive mode, which causes the charging of the measurement capacitor 15 to be stopped and the circuit 3 to be powered by the RF field. The method continues in a block 27, in which the analog/digital converter 18 is started for converting the analog voltage tapped from the measurement capacitor 15 into a digital representation given by the sensor data SD. After the analog/digital converter 18 has completed the conversion of the analog voltage into the sensor data SD, the sensor data are made available to the general processing means 10 for further processing, and the analog/digital converter 18 is switched off in order to reduce the power consumption.

Depending on the actual application scheme defining how these sensor data SD are to be further processed, the sensor data SD are either internally processed or communicated to the read/write station, or internally processed whereupon a processing result is communicated to the read/write station.

The procedure is then resumed at block 21.

In the present embodiment, the supporting energy source 6 is permanently connected to the sensitive device 5, which significantly limits the lifetime of this energy source 6.

In contrast to the first embodiment, the second embodiment of the invention provides a sensor 2 with extended lifetime of the supporting energy source 6. The sensor 2 according to the second embodiment of the invention comprises, in addition to the supporting energy supplying source 6 and the RF blocking inductance 4 and the sensitive device 5, a connecting circuit 29 which is designed for connecting the supporting energy source 6 to the sensitive device 5 only if an RF field is received. This provides that the sensitive device 5 is only powered when the circuit 3 is most likely to be active, which consequently provides a significant probability of interrogating measurement signals SS from the sensor 2.

Figure 3:
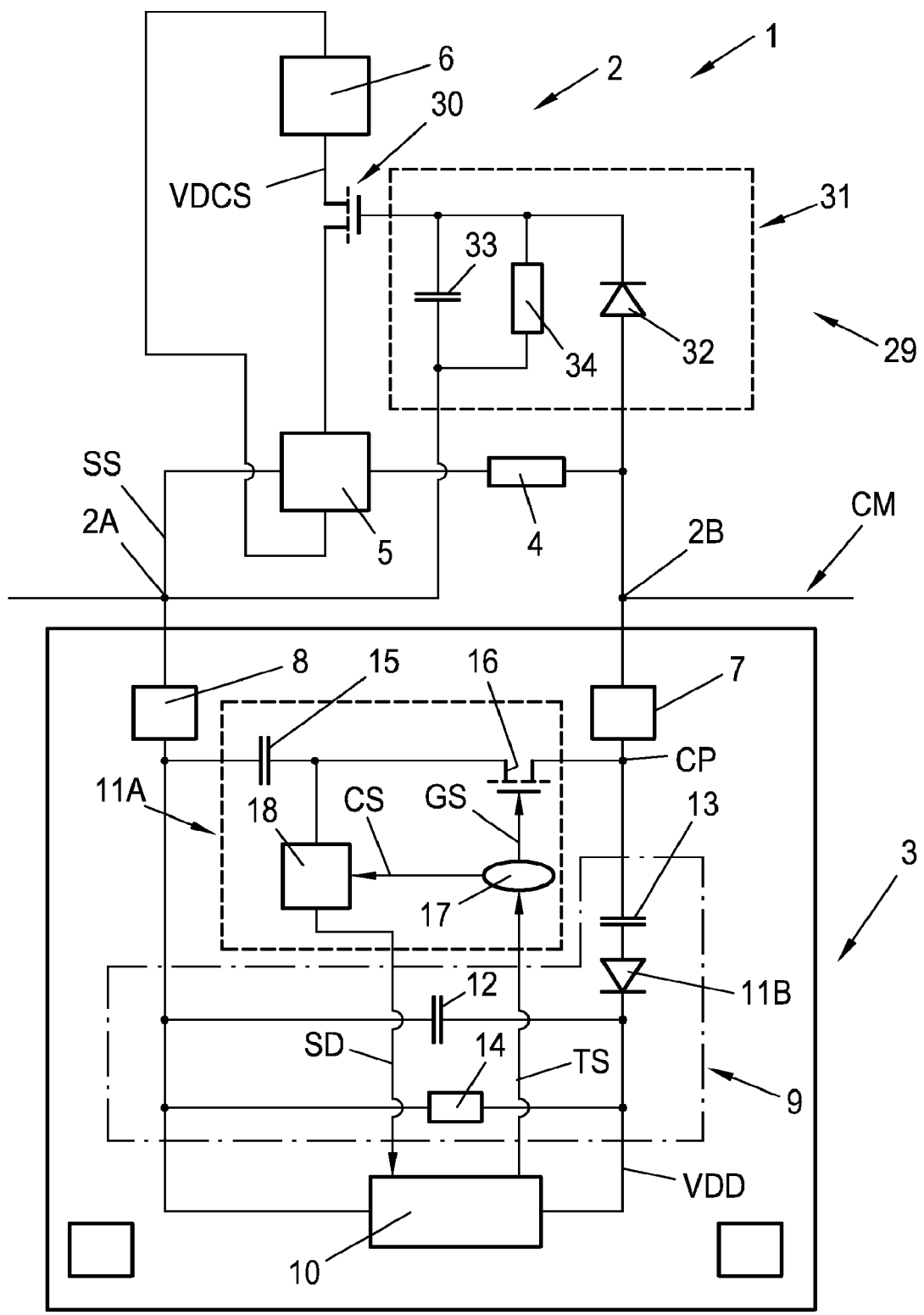
FIG. 3 is a block diagram of a data carrier according to a second embodiment of the invention.

The connecting circuit 29 comprises a second switching transistor 30 of the enhancement mode FET type, which second switching transistor 30 is connected between the supporting energy source 6 and the sensitive device 5, cf. FIG. 3, and comprises an RF detector circuit 31 connected by its two inputs to the connection pads 7 and 8 and by its output to a gate of the second switching transistor 30, as shown in FIG. 3. The RF detecting circuit 31 comprises a second Schottky diode 32 and a second buffer capacitor 33, which are connected in series. The connection point between the second Schottky diode 32 and the second buffer capacitor 33 forms the output of the connecting circuit 29, to which the gate of the switching transistor is connected. A second resistor 34 is connected in parallel to the second buffer capacitor 33. During operation, which means that an RF field is available, the second Schottky diode 32 acts a rectifier and rectifies the RF field, which charges the second buffer capacitor 33. The voltage built up at the gate of the second switching transistor 30 drives the second switching transistor 30 into its conducting mode, such that the supporting voltage VDCS becomes available for powering the sensitive device 5. The second resistor guarantees a minimum current flow through the Schottky diode 32.

Figure 4:
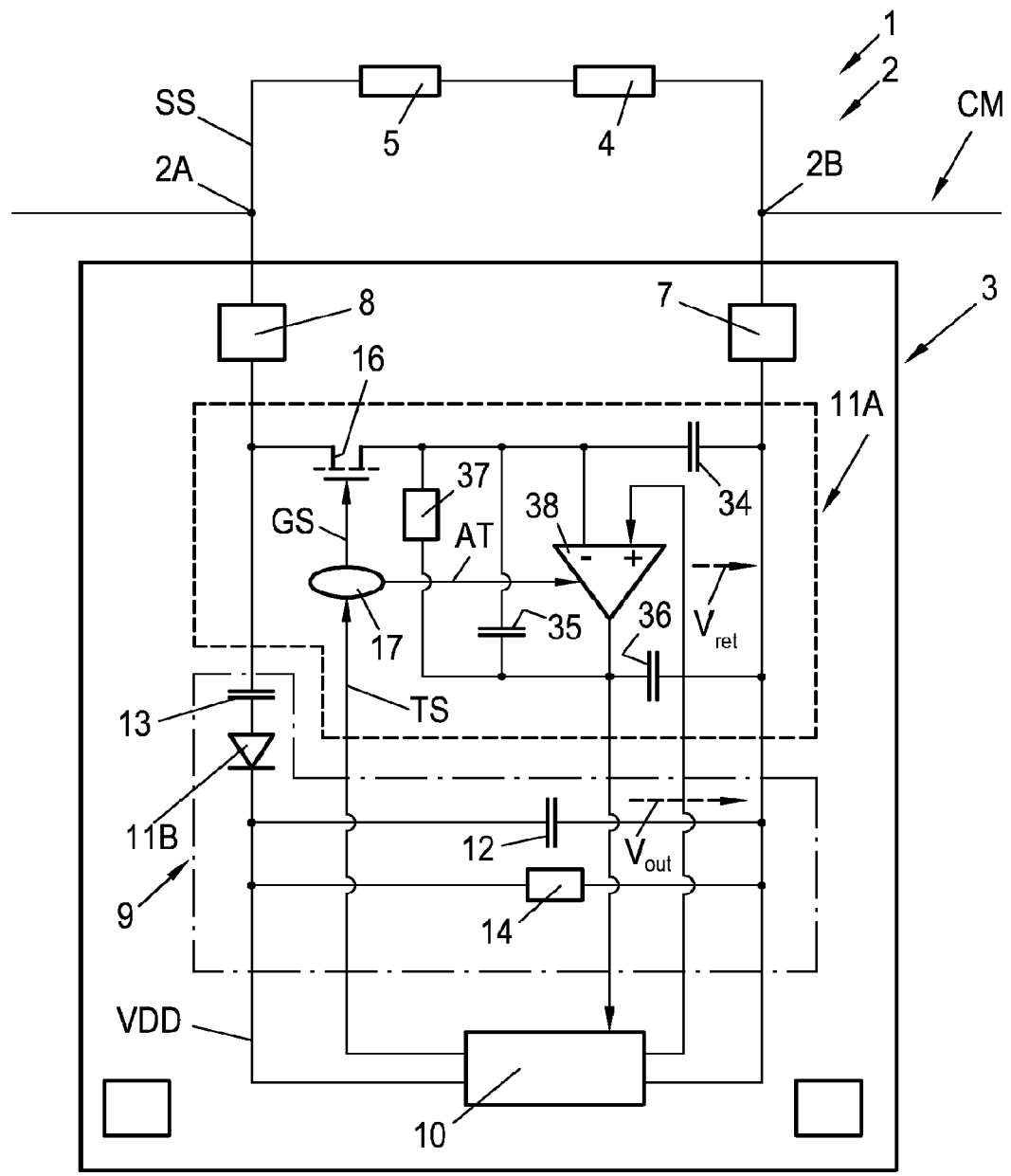
FIG. 4 is a block diagram a data carrier according to a third embodiment of the invention.

According to a third embodiment of the invention shown in FIG. 4, a data carrier 1 is equipped with a sensor 2 of the passive type, which passive sensor 2, unlike the preceding embodiments, does not comprise the supplying energy source 6. In the present case the circuit 3 comprises measures that allow the operation of such a passive sensor 2.

In the present case the sensor signal processing means 11A comprise, in addition to the first switching transistor 16, a first filter capacitor 34, a second filter capacitor 35, and a third filter capacitor 36, which three filter capacitors 34, 35 and 36 realize RF signal damping means. It is noted that other filter means, such as active filters, may be used instead of the three capacitors 34, 35 and 36 or in addition to these capacitors 34, 35 and 36. The sensor signal processing means 11A further comprise a third resistor 37 and an amplifying stage 38. In the present case the amplifying stage 38 is designed as a non-inverting amplifier realized by means of an operational amplifier. The amplifying stage 38 is connected at its inverting input (−) to a connection point between the first switching transistor 16 and the first filter capacitor 34. The third resistor 37 forms the feedback path of the amplifying stage.

Connected in parallel to the third resistor is the second filter capacitor. Connected between the output of the amplifying stage 38 and the first connection pad 7 is the third filter capacitor 36. The amplifying stage 38 is connected at its non-inverting input (+) to the general processing means 10. The amplifying stage 38 is further connected to the timing stage 17 in order to receive an operation control signal AT. The amplifying stage 38 is further designed to be switched on or off in dependence on the operation control signal AT. The power supply voltage for the amplifying stage 38 is identical to the power supply voltage VDD provided by the supply voltage generating means 9 for the other parts of the circuit 3.

The timing stage 17 is designed to provide the conductivity control signal GS as discussed for the preceding embodiments. In addition, the timing stage provides the operation control signal AT for the amplifying stage 38 in a synchronous manner to the gate control signal GS.

In the present case, the general processing means 10 are designed to provide a reference voltage $V_{ref}$ for the amplifying stage 38. However, it is to be noted that a reference voltage source may also be provided that is independent of the general processing means, e.g. forming part of the sensor signal processing means 11A. The general processing means 10 are further designed to receive an output signal $V_{out}$ of the amplifying stage 38 and to process this output signal $V_{out}$ in order to determine the sensor data SD, which sensor date SD represent the sensor signal SS. The converter means are thus realized by the amplifying stage 38 here, and the representation signal of the sensor signal SS is the output signal $V_{out}$.

During operation the general processing means 10 trigger the sensor data SD acquisition by releasing the timing signal TS to the timing stage 17. The timing stage 17 drives the first switching transistor 16 into its conducting mode. During the following measurement time period t the circuit is powered by the buffer capacitor 12 because the RF signal is damped by the three filter capacitors 34, 35 and 36. The amplifying stage 38 produces the output signal $V_{out}$ according to the following (third) equation:

$$U_{out} \cong \left(1 + \frac{R_2}{R_T}\right)$$

where $R_2$ is the value of the third resistor and $R_T$ is the, e.g. temperature-dependent, value of the sensing device 5. In the present case the resistance value $R_T$ of the sensitive device 5 is computed by the general processing means 10 according to the following (fourth) equation:

$$R_T \cong R_2 \frac{U_{ref}}{(U_{out} - U_{ref})}$$

and the physical value, e.g. the temperature, is retrieved by means of a lookup table. In the present case the sensor data SD, which are further processed, do represent the temperature. However, it may be desired for some reason to skip the computation of the resistance value $R_T$ of the sensitive device. In this situation the output signal $V_{out}$ is directly processed.

After having acquired the sensor date SD, the timing stage 17 drives the first switching transistor 16 back into its non-conductive mode and inhibits the operation of the amplifying stage 38. The operation of the data carrier 1 then continues as known from the prior art, which allows the further internal processing of the sensor data SD or communicating the sensor data SD to the read/write station by utilizing the RF field.

Alternatively, the sensor data SD may represent the output signal $V_{out}$ without prior conversion. In this situation the read/write station has to process the so-called raw data further.

It may be mentioned that the three filter capacitors 34, 35 and 36 can be omitted in a further embodiment. This implies that the RF field will be present on the one hand for producing the supply voltage during the measurement time period t, and on the other hand the RF signal will also be present in the output signal $V_{out}$, which requires the general processing stage 10 to perform more a sophisticated signal processing in order to acquire the sensor data SD.

Figure 5:
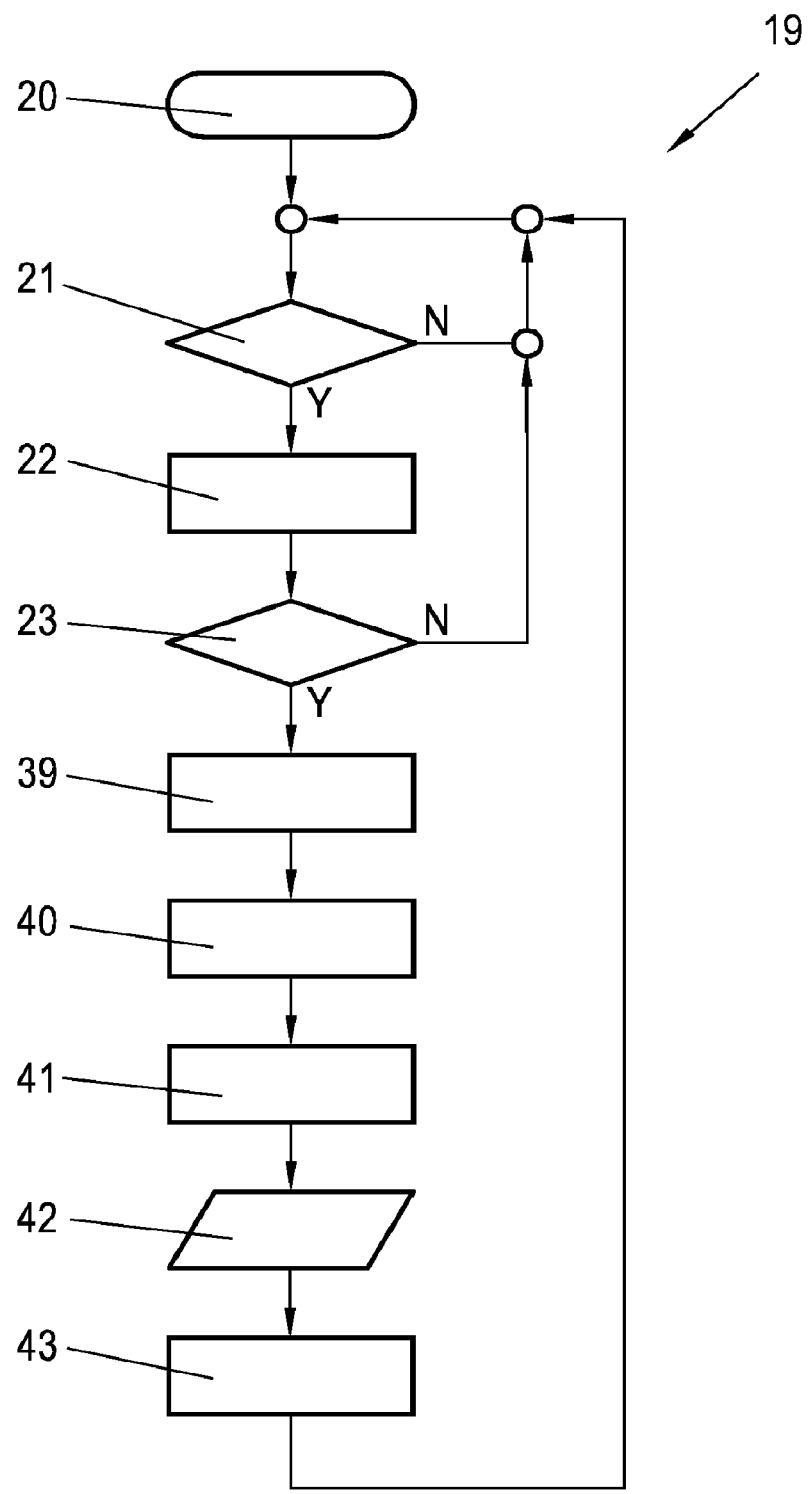
FIG. 5 is a flowchart of a method according to the invention performed by the data carrier according to the third embodiment of the invention.

The operation of the data carrier 1 according to the third embodiment will now be explained with reference to the method 19 according to the invention as visualized in the flowchart of FIG. 5. In contrast to the flowchart of FIG. 2, the flowchart FIG. 3 shows new blocks 39 to 43 following the block 23 known from the first embodiment.

In block 39, the first switching transistor 16 is driven into its conductive mode, and the RF signal is damped by the RF signal damping means. At the same time the amplifying means 38 are activated, whereupon the method 19 continues with block 40.

In block 40, the general processing means 40 produce the reference voltage $V_{ref}$ and release it to the amplifying means 38, which in their turn amplify the sensor signal SS according to the third equation, whereupon the method 19 continues with block 41.

In block 41, the general processing means 41 read the output voltage $V_{out}$ from the amplifying means 38, whereupon the method 19 continues with block 42.

In block 42, the general processing means 42 process the output signal $V_{out}$ according to the fourth equation and derive the temperature value from the lookup table, whereupon the method 19 continues with block 43.

In block 43, the first switching transistor 16 is driven into its non-conducting mode and the amplifying means 38 are inhibited from amplifying. The method 19 then returns to block 21.

To conclude, the measures as provided by the present invention provide the advantage that a relatively inexpensive conventional passive sensor 2 or a conventional active sensor 2 or an improved active sensor 2 according to the second embodiment of the invention can be used. In either case the sensor is simply connected to the connection means of the circuit 3 of the data carrier 1, to which connection means the communication means of the data carrier 1 are also connected.

It is noted that the general processing means 10 may be realized by a processor having a memory associated with it that is available within the circuit 3, or by a microprocessor having an internal memory. However, hard-wired logic circuits may also be considered.

Although the timing stage 17 was described above as a structural element within the circuit 3, it is noted that it may alternatively be realized by means of software executed by the general processing means 10.

It is to be noted that all embodiment of the circuit 3, in particular the electronic components 11A, 9, and 10 of the circuit 3, will perform in the same manner as described irrespective of whether they are connected to the two connection pads 8 and 7 as shown in the first and second embodiment of the invention or as shown in the third embodiment of the invention. In fact, the circuit (3) provides a symmetry with regard to the electronic components 11A, 9, and 10 which enables it to be connected to the pads 7, 8 in either way.

Although the Figures illustrating the various embodiments of the invention show that the sensor means 2 are connected to parts of the communication means CM by means of the sensor connection pads 2A and 2B, and the communication means CM are finally connected to the connection pads 7 and 8, it may be mentioned that the sensor connection pads 2A and 2B may alternatively be directly connected to the connection pads 8 and 7, e.g. on top of each other or side by side or in any other practical manner through well known measures.

Although the first switching transistor 16 is always shown as a field effect transistor in the Figures and throughout the description of the several embodiments, it is noted that the function of the first switching transistor 16 may alternatively be realized by several other components, e.g. analog switches, PNP transistors, and the like.

It may further be noted that the basic concept of designing the supply voltage generating means 9 can be replaced by any more advanced design known to those skilled in the art, e.g. single or multiple voltage pumps in combination with half- or full-wave rectifiers alone or in combination with linear voltage controllers.

It may further be noted that the basic concept of designing the RF detection circuit 31 can be replaced by any more advanced design known to those skilled in the art, e.g. single or multiple voltage pumps in combination with half- or full-wave rectifiers alone or in combination with linear voltage controllers.

Although dipole antennas are mentioned throughout the description, it is noted that any other antenna, even so-called loop antennas forming a direct current short-circuit, or any other antenna not forming a direct current short circuit, e.g. so-called micro-patch antennas, or so-called folded dipole antennas, may also be considered.

It should be noted that the further processing of sensor data SD may also comprise storing of sensor data SD produced at different measurement times (moments), such that a trend or a passing of a threshold can be judged.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention may be implemented by means of hardware comprising several distinct elements, and/or by means of a suitably programmed processor. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A circuit for communicating an output signal representative of an environmental parameter, the circuit arrangement comprising:
   a first connection pad and a second connection pad arranged to receive a radio frequency signal that communicates data and provides power to the circuit arrangement, the first connection pad arranged to receive a sensor signal that represents the environmental parameter, and the first connection pad and the second connection pad coupling the circuit arrangement for simultaneously receiving the radio frequency signal and the sensor signal;
   a measurement circuit coupled to the first and second connection pads, the measurement circuit arranged to receive the sensor signal via the first connection pad;
   a converter circuit coupled to the measurement circuit and arranged to convert a signal output by the measurement circuit into the output signal; and
   a shorting circuit coupled to the measurement circuit and configured and arranged to short-circuit the radio frequency signals between the connection pads during a sensing period in which the measurement circuit measures the sensor signal.

2. The circuit of claim 1, further comprising a voltage supply circuit coupled to the connection pads, measurement circuit, converter circuit, and shorting circuit, the voltage supply circuit configured and arranged to power the circuit arrangement, and to store power for powering the circuit arrangement while the radio frequency signals are short-circuited.

3. The circuit of claim 2, wherein the voltage supply circuit includes a Schottky diode and a buffer capacitor coupled in series between the connection pads.

4. The circuit of claim 1, further comprising a timing stage circuit coupled to the measurement circuit, wherein:
   the measurement circuit includes a capacitor that is connected to the first connection pad and a first switching transistor that is connected in series with the capacitor and connected to the second connection pad; and
   the timing stage circuit is configured and arranged to provide a conductivity control signal to the first switching transistor for controlling a conductivity mode of the first switching transistor.

5. The circuit of claim 4, wherein the timing stage circuit is further configured and arranged to generate and provide the conductivity control signal during a measurement time period t, such that the first switching transistor is driven into its conducting mode during the measurement time period t.

6. The circuit of claim 5, wherein the timing stage circuit is further configured and arranged to provide the conductivity signal between a lower time period limit $t_1$, defined by a charging time constant of the capacitor, and an upper time period limit t0, defined by a power consumption determined by electrical characteristics of the circuit.

7. A circuit for a data carrier, the data carrier including a sensor circuit that is configured to provide a sensor signal representative of an environment parameter and a communication circuit that is configured to provide contactless communication with an interrogator station, the circuit comprising:
   a first connection pad and a second connection pad arranged to connect the circuit to the communication circuit for communicating with the interrogator station and for receiving radio frequency power from the interrogator station, and arranged to connect the circuit to the sensor circuit for receiving the sensor signal;
   a sensor signal processor including a measurement circuit coupled to the first and second connection pads, the measurement circuit arranged to receive the sensor signal via the first connection pad, and the processor configured and arranged to process the received sensor signal, and in response to a signal from the measurement circuit provide an output to the interrogator station via the first and second connection pads;
   wherein the first connection pad and the second connection pad couple the circuit for simultaneously communicating with both the communication circuit and the sensor circuit; and
   a shorting circuit coupled to the measurement circuit and configured and arranged to short-circuit radio frequency signals coupled to the connection pads from the communication circuit, during a sensing period in which the signal processor is receiving a signal from the sensor circuit, via the respective pads.

8. The circuit of claim 7, wherein:
   the measurement circuit includes a capacitor that is connected to the first connection pad and a first switching transistor that is connected in series with the capacitor and connected to the second connection pad, and
   the sensor signal processor is configured and arranged to provide a conductivity control signal to a control electrode of the first switching transistor for controlling a conductivity mode of the first switching transistor.

9. The circuit of claim 8, wherein the sensor signal processor includes a timing stage configured and arranged generate and provide the conductivity control signal during a measurement time period t, such that the first switching transistor is driven into its conducting mode during the measurement time period t.

10. The circuit of claim 9, wherein the timing stage is configured and arranged to provide the conductivity signal between a lower time period limit $t_1$, defined by a charging time constant of the capacitor, and an upper time period limit t0, defined by a power consumption determined by electrical characteristics of the circuit.

11. A circuit arrangement for communicating an output signal representative of an environmental parameter, the circuit arrangement comprising:
   means, including a first connection pad and a second connection pad, for receiving a radio frequency signal that communicates data and provides power to the circuit arrangement, the first connection pad arranged to receive a sensor signal that represents the environmental parameter, and the first connection pad and the second connection pad coupling the circuit arrangement for simultaneously receiving the radio frequency signal and the sensor signal;
   means, including a measurement circuit coupled to the first and second connection pads, for receiving the sensor signal via the first connection pad;
   means for converting a signal output by the measurement circuit into the output signal; and
   a shorting means, coupled to the measurement circuit, for short-circuiting the radio frequency signals between the connection pads during a sensing period in which the measurement circuit measures the sensor signal.

12. A method for communicating an output signal representative of an environmental parameter, the method comprising:
   by using a first connection pad and a second connection pad, receiving a radio frequency signal that communicates data and provides power to the circuit arrangement, the first connection pad arranged to receive a sensor signal that represents the environmental parameter, and the first connection pad and the second connection pad coupling the circuit arrangement for simultaneously receiving the radio frequency signal and the sensor signal;
   by using a measurement circuit coupled to the first and second connection pads, receiving the sensor signal via the first connection pad;
   converting a signal output by the measurement circuit into the output signal; and
   short-circuiting the radio frequency signals between the connection pads during a sensing period in which the measurement circuit measures the sensor signal.

* * * * *